(12) United States Patent
Kawasaki et al.

(10) Patent No.: US 6,741,154 B2
(45) Date of Patent: May 25, 2004

(54) LOW-TEMPERATURE BURNT FERRITE MATERIAL AND FERRITE PARTS USING THE SAME

(75) Inventors: Kunihiko Kawasaki, Tokyo (JP); Hiroshi Momoi, Tokyo (JP); Takashi Suzuki, Tokyo (JP); Takahiro Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 51 days.

(21) Appl. No.: 10/012,321

(22) Filed: Dec. 12, 2001

(65) Prior Publication Data

US 2002/0114962 A1 Aug. 22, 2002

(30) Foreign Application Priority Data

Dec. 25, 2000 (JP) ........................................ 2000-392139
Feb. 15, 2001 (JP) ........................................ 2001-038805

(51) Int. Cl.$^7$ ................................................ H01F 5/00
(52) U.S. Cl. ........................................................ 336/200
(58) Field of Search ................................ 336/200, 223, 336/232; 252/62.6, 62.62, 62.61

(56) References Cited

FOREIGN PATENT DOCUMENTS

| JP | 1-179402 | 7/1989 |
|---|---|---|
| JP | 2-60110 | 2/1990 |
| JP | 5-258937 | 10/1993 |
| JP | 7-24242 | 3/1995 |
| JP | 2867196 | 12/1998 |
| JP | 11-144934 | 5/1999 |

*Primary Examiner*—Chau N. Nguyen
(74) *Attorney, Agent, or Firm*—Oblon, Spivak, McClelland, Maier & Neustadt, P.C.

(57) ABSTRACT

A nickel-basis ferrite material, a sulfur content of ferrite powder in a raw material stage is in a range of from 300 ppm to 900 ppm on S basis and a chlorine content of the ferrite powder is not higher than 100 ppm on Cl basis, while a sulfur content of a ferrite sinter after burning is not higher than 100 ppm on S basis and a chlorine content of the ferrite sinter is not higher than 25 ppm on Cl basis. Furthermore, a ferrite material is constituted by an Ni ferrite material using a nickel compound as a raw material, the nickel compound having a specific surface area in a range of from 1.0 m$^2$/g to 10 m$^2$/g and a sulfur content in a range of from 100 ppm to 1,000 ppm on S basis.

14 Claims, 1 Drawing Sheet

Fig. 1

LOW-TEMPERATURE BURNT FERRITE MATERIAL AND FERRITE PARTS USING THE SAME

BACKGROUND OF THE INVENTION

The present invention relates to a ferrite material for a ceramic inductor, and particularly relates to a ferrite material stable and excellent in temperature characteristic and for use in ferrite sinter used as various magnetic materials, which is capable of being burnt at a low temperature, and ferrite parts such as chip inductors, chip beads parts, composite multi-layer parts, ferrite cores, etc., using the ferrite material.

For example, multi-layer chip parts such as chip inductors or chip beads parts are usually manufactured as follows. That is, a magnetic substance layer paste and an internal conductor paste are laminated integrally by thick film technology and then burnt, external electrodes are formed by use of an external electrode paste, and the thus integrated lamination is then burnt to thereby manufacture the multi-layer chip part.

In this case, Ni—Cu—Zn ferrite which can be sintered at a temperature low to be not higher than the melting point of Ag composing internal electrodes is generally used as a magnetic material for the magnetic layers.

When Ni—Cu—Zn ferrite or Ni—Zn ferrite is used, $Fe_2O_3$ obtained by thermal decomposition using a hydrochloric acid pickling waste liquor for iron chloride as a starting material, or $Fe_2O_3$ obtained by thermal decomposition of iron sulfate obtained from a sulfuric acid pickling waste liquor for steel is used for producing iron oxide which is one of raw materials for the ferrite. As a result, a small amount of S or Cl exists in the ferrite raw material inevitably. Thus, it is known that the ferrite affects electromagnetic properties, that is, inductance properties, or sintering properties, that is, density, in accordance with the content of S or Cl (JP-B-2867196 or JP-A-11-144934).

In addition, there is proposed a production method in which additives (sintering auxiliaries) such as glass, bismuth oxide, vanadium oxide, etc., are added to obtain a high-density ferrite sinter (see JP-B-7-24242 or JP-A-1-179402). If such additives are contained, there occurs a scattering in particle size of crystals, causing the deterioration of $\mu$, Q and temperature characteristic.

In a conventional ferrite material, a high-density sinter having few vacancies cannot be obtained at a low burning temperature, that is, at a burning temperature not higher than the melting point of Ag used for internal conductors. Thus, the magnetic properties deteriorate in a moisture resistance load test or the like.

Therefore, even if the ferrite material is burnt at a high temperature or the density is increased by use of additives, there is a problem of side effects as follows. That is, disconnection or disappearance is brought about in internal conductors, or out-of-phase is produced in the grain boundary due to diffusion of Ag, or segregation of Cu. Thus, inductance, Q, or temperature characteristic is deteriorated, or a migration phenomenon is caused by the diffused Ag. As a result, deterioration of insulation resistance or failure due to short-circuit is brought about.

A ferrite material is generally obtained by mixing an iron compound and other ferrite constituent element compounds, and burning this mixture provisionally. In this provisionally burning process, it is known that the solid phase reaction rate to form spinel crystals varies in accordance with the content of S or Cl contained in the ferrite mixture powder (See JP-A-11-144934). Due to a difference of this reaction rate, a raw material or an intermediate product is residual or out-of-phase is produced by segregation of the raw material or the intermediate product by thermal dissociation. As a result, the powder composition is made uneven to have a bad influence on the sinter density or the magnetic properties.

It is also known that the content of S or Cl residual in powder obtained by pulverizing the powder after temporary burning affects the magnetic properties (see JP-B-2867196). This S or Cl is contained in the ferrite constituent element compounds.

SUMMARY OF THE INVENTION

It is an object of the present inventors to provide a ferrite material which is an Fe—Ni—Cu—Zn—Mg ferrite material or an Fe—Ni—Cu—Zn ferrite material, the S and Cl contents of which are regulated so that the ferrite material provides a high density and a small temperature characteristic for multi-layer chip parts and magnetic cores without using any additive.

In order to attain the foregoing object, the present inventors have found that by regulating the S and Cl contents of ferrite powder in a ferrite material as shown in the following paragraphs (A1) to (A3), it is possible to provide a ferrite material which provides a high density without using any additive, and has a small temperature characteristic in spite of the high density, and it is possible to provide high-performance ferrite parts such as chip inductors, chip beads parts, composite multi-layer parts, ferrite cores, etc., as shown in the following paragraphs (A4) to (A6), by use of this ferrite material.

(A1) In an Fe—Ni—Cu—Zn—Mg ferrite material, a sulfur content of ferrite powder in a raw material stage is in a range of from 300 ppm to 900 ppm on S basis and a chlorine content of the ferrite powder is not higher than 100 ppm on Cl basis, while a sulfur content of a ferrite sinter after burning is not higher than 100 ppm on S basis and a chlorine content of the ferrite sinter is not higher than 25 ppm on Cl basis.

(A2) In an Fe—Ni—Cu—Zn ferrite material, a sulfur content of ferrite powder in a raw material stage is in a range of from 300 ppm to 900 ppm on S basis and a chlorine content of the ferrite powder is not higher than 100 ppm on Cl basis, while a sulfur content of a ferrite sinter after burning is not higher than 100 ppm on S basis and a chlorine content of the ferrite sinter is lower than 10 ppm on Cl basis.

(A3) In the ferrite material defined in the paragraph (A1), the ferrite material has a composition of $Fe_2O_3$ ranging from 25 mol % to 52 mol %, ZnO of 40 mol % or lower, CuO of 20 mol % or lower, NiO of 65 mol % or lower, and MgO occupying a remainder.

(A4) A chip part is constituted by a chip inductor or a chip beads part configured by laminating ferrite magnetic layers and internal conductors, wherein the ferrite magnetic layers are composed of a ferrite material defined in any one of the paragraphs (A1) to (A3).

(A5) A composite multi-layer part is constituted by at least an inductor portion configured by laminating ferrite magnetic layers and internal conductors, wherein the ferrite magnetic layers are composed of a ferrite material defined in any one of the paragraphs (A1) to (A3).

(A6) A ferrite core is constituted by a ferrite material defined in any one of the paragraphs (A1) to (A3).

It is therefore another object of the present invention to provide a ferrite material which is constituted by an Ni ferrite material providing a high density and a small temperature characteristic for a multi-layer chip part and a magnetic core without using any additive.

In order to obtain the foregoing object, the present inventors have found that ferrite materials capable of attaining the object can be provided as shown in the following paragraphs (B1) and (B2), and ferrite parts capable of attaining the object can be provided as shown in the following paragraphs (B3) to (B5).

(B1) A ferrite material constituted by an Ni ferrite material using a nickel compound as a raw material, the nickel compound having a specific surface area in a range of from 1.0 $m^2/g$ to 10 $m^2/g$ and a sulfur content in a range of from 100 ppm to 1,000 ppm on S basis.

(B2) A ferrite material according to the paragraph (B1), wherein the Ni ferrite material has a composition of $Fe_2O_3$ ranging from 25 mol % to 52 mol %, ZnO ranging from 0 mol % to 40 mol %, CuO ranging from 0 mol % to 20 mol %, NiO ranging 1 mol % to 65 mol %, and MgO occupying the remainder.

(B3) A chip part constituted by a chip inductor or a chip beads part configured by laminating ferrite magnetic layers and internal conductors; wherein the ferrite magnetic layers is composed of: an Ni ferrite material using a nickel compound as a raw material, the nickel compound having a specific surface area in a range of from 1.0 $m^2/g$ to 10 $m^2/g$ and a sulfur content in a range of from 100 ppm to 1,000 ppm on S basis; or an Ni ferrite material using a nickel compound as a raw material, the nickel compound having a specific surface area in a range of from 1.0 $m^2/g$ to 10 $m^2/g$ and a sulfur content in a range of from 100 ppm to 1,000 ppm on S basis, the Ni ferrite material having a composition of $Fe_2O_3$ ranging from 25 mol % to 52 mol %, ZnO ranging from 0 mol % to 40 mol %, CuO ranging from 0 mol % to 20 mol %, NiO ranging 1 mol % to 65 mol %, and MgO occupying the remainder.

(B4) A composite multi-layer part constituted by at least an inductor portion configured by laminating ferrite magnetic layers and internal conductors; wherein the ferrite magnetic layers is composed of: an Ni ferrite material using a nickel compound as a raw material, the nickel compound having a specific surface area in a range of from 1.0 $m^2/g$ to 10 $m^2/g$ and a sulfur content in a range of from 100 ppm to 1,000 ppm on S basis; or an Ni ferrite material using a nickel compound as a raw material, the nickel compound having a specific surface area in a range of from 1.0 $m^2/g$ to 10 $m^2/g$ and a sulfur content in a range of from 100 ppm to 1,000 ppm on S basis, the Ni ferrite material having a composition of $Fe_2O_3$ ranging from 25 mol % to 52 mol %, ZnO ranging from 0 mol % to 40 mol %, CuO ranging from 0 mol % to 20 mol %, NiO ranging 1 mol % to 65 mol %, and MgO occupying the remainder.

(B5) A ferrite core constituted by: an Ni ferrite material using a nickel compound as a raw material, the nickel compound having a specific surface area in a range of from 1.0 $m^2/g$ to 10 $m^2/g$ and a sulfur content in a range of from 100 ppm to 1,000 ppm on S basis; or an Ni ferrite material using a nickel compound as a raw material, the nickel compound having a specific surface area in a range of from 1.0 $m^2/g$ to 10 $m^2/g$ and a sulfur content in a range of from 100 ppm to 1,000 ppm on S basis, the Ni ferrite material having a composition of $Fe_2O_3$ ranging from 25 mol % to 52 mol %, ZnO ranging from 0 mol % to 40 mol %, CuO ranging from 0 mol % to 20 mol %, NiO ranging 1 mol % to 65 mol %, and MgO occupying the remainder.

DETAILED DESCRIPTION OF THE PREFERRED EMBODIMENTS

First Embodiment

The ferrite material according to the present invention will be described below more specifically. First, ferrite constituent element compounds, for example, $Fe_2O_3$, NiO, CuO, ZnO and MgO are used, weighed to prepare an intended composition after burning, and wet-mixed with pure water by a ball mill or the like. The wet-mixed mixture is dried by a spray drier or the like, and then burnt provisionally. The provisionally burnt mixture is levigated, and then dried by a spray drier or the like. Thus, ferrite powder is obtained.

This ferrite powder which has been pulverized and dried is set to have a sulfur content in a range of from 300 ppm to 900 ppm on S element basis and a chlorine content of 100 ppm or lower on Cl element basis.

When the sulfur content is below 300 ppm on S basis in the ferrite raw material stage, the value of the sinter density is lower than the sinter density 4.85 $g/cm^3$ guaranteeing the resistance to moisture. On the contrary, when the sulfur content exceeds 900 ppm, the sinter density becomes high, but the diffusion of Ag or the segregation of Cu increases so that the inductance or the temperature characteristic deteriorates. Here, the temperature characteristic indicates a rate of change between inductance measured at 25° C. and inductance measured at 85° C. with the inductance at 25° C. as a reference.

The temperature characteristic is preferably within ±3%, more preferably within ±2%. Accordingly, it is more preferable that the sulfur content is in a range of from 300 ppm to 700 ppm on S basis in the ferrite raw material stage.

Even in the case where the sulfur content is in a range of from 300 ppm to 900 ppm on S basis in the ferrite raw material stage, if the chlorine content exceeds 100 ppm on Cl basis, the sinter density deteriorates.

When the S and Cl contents in the ferrite raw material stage are within the above-mentioned ranges respectively, the sulfur content in the ferrite sinter after burning becomes not higher than 100 ppm on S basis, and the chlorine content in the ferrite sinter becomes not higher than 25 ppm on Cl basis. In the case where Ag is used for internal conductors in a product, if the sulfur content in the ferrite sinter exceeds 100 ppm on S basis, the diffusion of Ag into the magnetic substance increases so that the inductance and the temperature characteristic deteriorate. If the chlorine content exceeds 25 ppm on Cl basis, the sinter density and the temperature characteristic deteriorate.

The sulfur content may be measured by analyzing $SO_2$ converted by burning and oxidizing in the oxygen atmosphere by an infrared detector. On the other hand, the chlorine content may be measured by extracting Cl by steam distillation and measuring the absorbance of the extracted liquid.

In the temporary burning of the mixed powder, powder parts provisionally burnt at different temperatures are measured by an X ray diffractometer so that a provisionally burning temperature highest in the spinel synthesis rate may be selected. Here, the spinel synthesis rate means a value expressed by the following expression from peak intensity ($Isp311$) of a (311) plane of spinel ferrite, peak intensity ($IFe104$) of a (104) plane of $\alpha$-$Fe_2O_3$, and peak intensity ($ICu111$) of a (111) plane of CuO in powder X ray diffraction. In addition, the X ray diffraction was measured under the conditions of a source of Cu, a voltage of 40 KV, a current of 40 mA, and a scanning speed of 2°/min.

(spinel synthesis rate)=$(Isp311)/(Isp311+IFe104+ICu111)\times 100(\%)$

If the spinel synthesis rate is lower than 96%, plenty of ferrite constituent element compounds are residual so that the sinter density is low. Accordingly, the spinel synthesis rate is preferably not lower than 96%, and more preferably not lower than 99%.

The ranges of components of the ferrite composition are limited in the present invention for the following reasons. If the principal component $Fe_2O_3$ is out of the range of from 25 mol % to 52 mol %, the sinter density becomes low to cause a problem of deterioration of specific permeability, Q, IR (insulation resistance), or the like. If ZnO exceeds 40 mol %, Q is lowered so that the Curie temperature becomes not higher than 100° C. That is not practical.

If CuO exceeds 20 mol %, Q is lowered. In addition, when the ferrite material having CuO exceeding 20 mol % is used for a composite multi-layer part, CuO or ZnO is deposited in a bonded surface with a different material such as a capacitor material or the like. Thus, IR is lowered. If NiO exceeds 65 mol %, the ferrite material is not sintered at a temperature not higher than the melting point of Ag. When MgO is substituted for a part of NiO, the temperature characteristic is improved while the sinter density and the specific permeability are kept. However, if MgO exceeds 15 mol %, the sinter density or the specific permeability deteriorates. Thus, the content of MgO is preferably not higher than 15 mol %. In addition, other oxides of Co, Mn, etc. may be contained by about 2 wt % or lower of the whole.

The above-mentioned composition of $Fe_2O_3$, NiO, CuO, ZnO and MgO may be measured by fluorescent X-ray analysis based on a glass beads method.

Thus, it is possible to obtain a ferrite material which provides a high density for ferrite without using any additive, and which has a small temperature characteristic in spite of the high density. In addition, ferrite cores and multi-layer chip parts composed of this ferrite material are excellent in resistance to moisture and temperature characteristic. Further, the scattering of the sinter density or the inductance can be reduced.

Examples of First Embodiment

Examples of the present invention will be described below. Respective raw materials were weighed to prepare a composition which would have 49.0 mol % of $Fe_2O_3$, 25.0 mol % of NiO, 12.0 mol % of CuO, and 14.0 mol % of ZnO, after burning. In Examples 1 and 2 and Comparison Example 3, MgO was substituted for a part of NiO, and respective raw materials were weighed to prepare a composition which would have 49.0 mol % of $Fe_2O_3$, 20.0 mol % of NiO, 5 mol % of MgO, 12.0 mol % of CuO, and 14.0 mol % of ZnO. The respective raw materials were wet-mixed with pure water by a ball mill, and dried by a spray drier. Next, this mixture powder was burnt provisionally at 700° C. to 800° C. for 10 hours. After that, the provisionally burnt powder is levigated with pure water by a ball mill, and dried by a spray drier.

Ten parts by weight of polyvinyl alcohol were added to 100 parts by weight of the pulverized powder obtained thus, and formed into granules. Then, the granules were press-molded into a toroidal shape. This molded article was burnt at 880° C. for 2 hours. Thus, a sinter was obtained. The sinter density was calculated from the weight and dimensions of the sinter. Specific permeability $\mu$ i and Q were measured as follows. That is, a wire made of copper was wound into a toroidal shape by 20 turns. Inductance and Q were measured by an LCR meter under the conditions of the measuring frequency 10 MHz and the measuring current 0.5 mA. The specific permeability $\mu i$ was obtained by the following expression.

(specific permeability $\mu i)=(le \times L)/(\mu o \times Ae \times N^2)$ le: magnetic path length, L: inductance of specimen, $\mu o$: permeability in vacuum, Ae: sectional area of specimen, and N: number of turns of coil Next, a multi-layer chip inductor was made up. Four parts by weight of ethyl cellulose and 78 parts by weight of terpineol were added to 100 parts by weight of the pulverized powder, and kneaded by a three-roll mill so as to prepare a magnetic substance layer paste. On the other hand, 2.5 parts by weight of ethyl cellulose and 40 parts by weight of terpineol were added to 100 parts by weight of Ag having a mean particle size of 0.6 $\mu$m, and kneaded by a three-roll mill so as to prepare an internal electrode paste. The magnetic substance layer paste and the internal electrode paste obtained thus were printed alternately so as to be laminated on each other, and burnt at 850° C. for 2 hours. Thus, a multi-layer chip inductor was obtained.

This 3216 type (3.2 mm long and 1.6 mm wide) multi-layer chip inductor measured 3.2 mm by 1.6 mm by 1.2 mm, and the number of turns was set to be 9.5. Next, external electrodes were formed in end portions of the multi-layer chip inductor by burning at 600° C. Inductance L and Q were measured by means of an LCR meter under the conditions of the measuring frequency 10 MHz and the measuring current 0.1 mA.

Inductance at 25° C. and inductance at 85° C were measured in the measuring frequency 1 MHz, and a rate of change with the inductance at 25° C. as a reference was adopted as the temperature characteristic of the inductance of each toroidal shape and each multi-layer chip inductor.

Incidentally, desired S and Cl contents were obtained by selecting raw materials having different S contents or different Cl contents.

This result is shown in Table 1.

TABLE 1

| | S and Cl contents in ferrite raw material stage | | S and Cl contents in ferrite sinter | | Toroidal shape burnt at 880° C. | | | | multi-layer chip inductor burnt at 850° C. | | | |
|---|---|---|---|---|---|---|---|---|---|---|---|---|
| | | | | | Sinter | | | temperature | sinter | | | temperature |
| | S (ppm) | Cl (ppm) | S (ppm) | Cl (ppm) | density (g/cm$^3$) | specific permeability | Q | characteristic (%) | density (g/cm$^3$) | inductance ($\mu$H) | Q | characteristic (%) |
| Ex.1 | 300 | 70 | 60 | 15 | 4.91 | 81.4 | 133 | 0.98 | 5.24 | 4.32 | 62 | 1.92 |
| Ex.2 | 300 | 100 | 60 | 25 | 4.90 | 80.5 | 130 | 1.20 | 5.25 | 4.32 | 57 | 1.80 |
| Ex.3 | 400 | 0 | 62 | 0 | 4.91 | 80.6 | 131 | 1.11 | 5.25 | 4.33 | 57 | 1.65 |
| Ex.4 | 550 | 8 | 78 | 0 | 4.90 | 81.2 | 122 | 0.62 | 5.26 | 4.38 | 60 | 1.79 |

TABLE 1-continued

|  | S and Cl contents in ferrite raw material stage | | S and Cl contents in ferrite sinter | | Toroidal shape burnt at 880° C. | | | | multi-layer chip inductor burnt at 850° C. | | | |
|---|---|---|---|---|---|---|---|---|---|---|---|---|
|  | S (ppm) | Cl (ppm) | S (ppm) | Cl (ppm) | Sinter density (g/cm³) | specific permeability | Q | temperature characteristic (%) | sinter density (g/cm³) | inductance (μH) | Q | temperature characteristic (%) |
| Ex.5 | 580 | 5 | 70 | 0 | 4.90 | 80.7 | 130 | 1.05 | 5.24 | 4.34 | 58 | 1.24 |
| Ex.6 | 620 | 40 | 90 | 9 | 4.90 | 81.2 | 133 | 1.22 | 5.25 | 4.39 | 67 | 1.50 |
| Ex.7 | 700 | 5 | 98 | 0 | 4.91 | 81.5 | 125 | 1.93 | 5.25 | 4.30 | 56 | 1.70 |
| Ex.8 | 900 | 5 | 100 | 0 | 4.93 | 81.8 | 125 | 2.59 | 5.25 | 4.25 | 56 | 2.25 |
| Comp.1 | 150 | 400 | 40 | 120 | 4.40 | 49.3 | 141 | 4.25 | 4.43 | 4.00 | 50 | 6.98 |
| Comp.2 | 180 | 2 | 54 | 0 | 4.66 | 60.9 | 138 | −1.56 | 5.09 | 4.05 | 54 | −0.98 |
| Comp.3 | 330 | 125 | 64 | 30 | 4.69 | 60.0 | 130 | −1.10 | 4.99 | 4.00 | 51 | 3.88 |
| Comp.4 | 950 | 6 | 133 | 0 | 5.00 | 86.5 | 112 | 4.15 | 5.30 | 4.02 | 55 | 4.28 |

As is apparent from Table 1, when the sulfur content in the raw material stage is lower than 300 ppm on S basis, as shown in Comparison Examples 1 and 2, the sinter density is low to be not higher than 4.85 g/cm³ in the toroidal shape and not higher than 5.15 g/cm³ in the multi-layer chip inductor. Thus, the sinter density does not reach a value to be able to guarantee resistance to moisture.

When the sulfur content in the raw material stage exceeds 900 ppm on S basis, as shown in Comparison Example 4, the temperature characteristic shows a large value, to be not lower than 4%, both in the toroidal shape and in the multi-layer chip inductor.

When the chlorine content in the raw material stage exceeds 100 ppm on Cl basis, as shown in Comparison Examples 1 and 3, the sinter density is low to be not higher than 4.85 g/cm³ in the toroidal shape and not higher than 5.15 g/cm³ in the multi-layer chip inductor. Thus, the sinter density does not reach a value to be able to guarantee resistance to moisture.

On the other hand, when the sulfur content in the ferrite sinter exceeds 100 ppm on S basis, as shown in Comparison Example 4, the temperature characteristic shows a large value to be not lower than 4% both in the toroidal shape and in the multi-layer chip inductor.

When the chlorine content in the ferrite sinter containing MgO exceeds 25 ppm on Cl basis, as shown in Comparison Example 3, the sinter density is low to be not higher than 4.85 g/cm³ in the toroidal shape and not higher than 5.15 g/cm³ in the multi-layer chip inductor. Thus, the sinter density does not reach a value to be able to guarantee resistance to moisture.

When the chlorine content in the ferrite sinter not containing MgO is lower than 10 ppm on Cl basis, as shown in Example 6, the sinter density satisfies a value to guarantee the resistance to moisture. Thus, the electromagnetic property and the temperature characteristic are excellent both in the toroidal shape and in the multi-layer chip inductor.

Thus, it is understood that if the ferrite material satisfies the ranges defined in the present invention, the sinter density is not lower than 4.85 g/cm³ in the toroidal shape and not lower than 5.15 g/cm³ in the multi-layer chip inductor, while the temperature characteristic is restrained to be within ±3%.

Next, with reference to FIG. 1, description will be made about an LC composite multi-layer part using a ferrite material composed of 49 mol % of $Fe_2O_3$, 17 mol % of NiO, 9 mol % of CuO and 25 mol % of ZnO according to the present invention.

Figure 1:
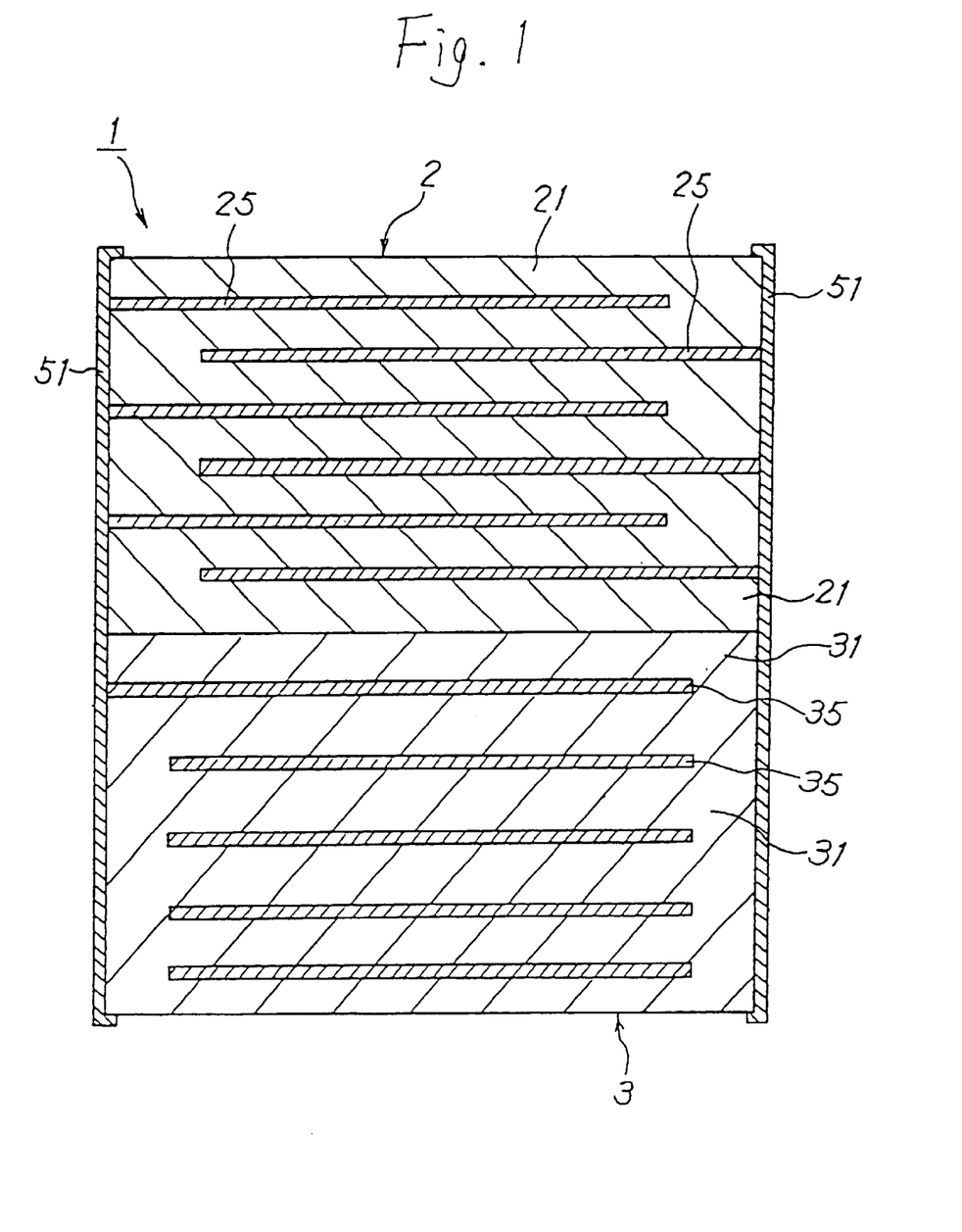
FIG. 1 is a view showing an example of a composite multi-layer part using a low-temperature sintered and high-performance ferrite material according to the present invention.

An LC composite part 1 shown in FIG. 1 is integrally constituted by a capacitor portion 2 constituted by ceramic dielectric layers 21 and internal electrode layers 25 laminated on each other, and an inductor portion 3 constituted by ceramic magnetic substance layers 31 and internal conductors 35 laminated on each other. External electrodes 51 are formed on the surface of the LC composite part 1.

Incidentally, the capacitor portion 2 and the inductor portion 3 may have a conventionally known structure. Each of the capacitor portion 2 and the inductor portion 3 is formed into a substantially rectangular shape. The dimensions of the LC composite part 1 are not limited particularly, but can be set suitably in accordance with applications. The dimensions of the LC composite part 1 may measure approximately 1.6~10.0 mm by 0.8~15.0 mm by 1.0~5.0 mm.

The ceramic magnetic substance layers 31 constituting the inductor portion 3 are composed of a ferrite material according to the present invention. That is, a magnetic substance layer paste obtained by kneading the ferrite material according to the present invention with a binder of ethyl cellulose or the like and a solvent of terpineol, butyl carbitol, or the like, is printed and laminated alternately with an internal electrode paste. Thus, the inductor portion 3 is formed. The contents of the binder and the solvent in the magnetic substance layer paste are not limited. For example, the content of the binder maybe set to be in a range of from 1 wt % to 5 wt %, and the content of the solvent may be set to be approximately in a range of from 10 wt % to 50 wt %.

Alternatively, the inductor portion 3 may be formed by use of a ceramic magnetic substance layer sheet. That is, slurry obtained by kneading the ferrite material according to the present invention with a binder having polyvinyl butyral or acrylic resin as its principal component and a solvent of toluene, xylene, or the like, in a ball mill, is applied onto a polyester film or the like in a doctor blade method or the like, and dried to obtain a magnetic substance layer sheet.

The content of the binder in this magnetic substance layer sheet is not limited. For example, the content of the binder may be set to be approximately in a range of from 1 wt % to 5 wt %.

The conductive material composing the internal electrodes 35 of the inductor portion 3 is not limited particularly. It is, however, preferable that the internal electrodes 35 are formed out of a conductive material mainly composed of Ag with a low electric resistivity in order to obtain practical Q for inductor. Ag, Ag alloys, Cu, Cu alloys, etc. are usually used. Each layer of the internal electrodes 35 has an oval shape. Spiral electrical conduction is ensured between adjacent layers of the internal electrodes 35. Thus, the internal electrodes 35 form a closed magnetic path coil (winding pattern). The external electrodes 51 are connected to the opposite ends of the closed magnetic path coil.

In such a case, the winding pattern, that is, the closed magnetic path shape of the internal conductors 35 can be formed into various patterns. The number of turns thereof may be selected suitably in accordance with applications. In addition, the dimensions, and so on, of respective parts in the inductor portion 3 are not limited, but may be selected suitably in accordance with applications.

Incidentally, the internal conductors 35 are usually designed so that the thickness is approximately in a range of from 3 $\mu$m to 50 $\mu$m, the winding pitch is approximately in a range of from 10 $\mu$m to 400 $\mu$m, and the number of turns is approximately in a range of from 1.5 to 50.5. On the other hand, the magnetic layers 31 are usually designed so that the base thickness is approximately in a range of from 100 $\mu$m to 500 $\mu$m, and the magnetic layer thickness between the internal conductors 35 and 35 is approximately in a range of from 10 $\mu$m to 100 $\mu$m.

The material used for the ceramic dielectric layers 21 of the capacitor portion 2 is not limited particularly. Although various dielectric materials are available, it is preferable that a titanium oxide dielectric material is used because it has a low burning temperature. Alternatively, titanate composite oxides, zirconate composite oxides, or mixtures thereof may be used. In addition, the material may contain glass such as borosilicate glass in order to reduce the burning temperature.

Specifically, $TiO_2$ or the like containing NiO, CuO, $Mn_3O_4$, $Al_2O_3$, MgO, $SiO_2$, or the like, particularly containing Cuo, in accordance with necessity, may be used as the titanium oxide dielectric material; $BaTiO_3$, $SrTiO_3$, $CaTiO_3$, $MgTiO_3$, or a mixture thereof, may be used as the titanate composite oxide; and $BaZrO_3$, $SrZrO_3$, $CaZrO_3$, $MgZrO_3$, or a mixture thereof may be used as the zirconate composite oxide.

Alternatively, if a mixed material is not used, for example, non-magnetic Zn ferrite or the like may be used.

A dielectric layer paste obtained by kneading the material used for the ceramic dielectric layers 21 of the capacitor portion 2 together with various binders and solvents may be printed and laminated alternately with the internal electrode paste. The contents of the binder and the solvent contained in the dielectric layer paste are not limited. For example, the content of the binder may be set to be in a range of from 1 wt % to 5 wt %, and the content of the solvent may be set to be approximately in a range of from 10 wt % to 50 wt %.

Alternatively, the capacitor portion 2 may be formed by use of a dielectric layer sheet. That is, slurry obtained by kneading a dielectric material with various binders and solvents in a ball mill is applied onto a polyester film or the like in a doctor blade method or the like, and dried to obtain a dielectric layer sheet. This dielectric layer sheet and the internal electrode paste are laminated alternately. Thus, the capacitor portion 2 can be formed. The content of the binder in this dielectric layer sheet is not limited. For example, the content of the binder may be set to be approximately in a range of from 1 wt % to 5 wt %.

The conductive material composing the internal electrode layers 25 of the capacitor portion 2 is not limited particularly. The conductive material may be selected from Ag, Pt, Pd, Au, Cu, Ni, alloys containing at least one kind of such metal, for example, an Ag—Pd alloy, and so on. Particularly, Ag, Ag alloys such as an Ag—Pd alloy, and so on, are preferred.

The dimensions of respective parts in the capacitor portion 2 are not limited particularly, but may be selected suitably in accordance with applications or the like.

Incidentally, the number of the dielectric layers 21 is in a range of from 1 to 100, the thickness per layer of the dielectric layers is in a range of from 10 $\mu$m to 150 $\mu$m, and the thickness per layer of the internal electrode layers 25 is approximately in a range of from 3 $\mu$m to 30 $\mu$m.

The conductive material used for the external electrodes 51 is not limited particularly. The conductive material may be selected from Ag, Pt, Pd, Au, Cu, Ni, alloys containing at least one kind of such metal, for example, an Ag—Pd alloy, and so on. The shape, dimensions, and so on, of the external electrodes 51 are not limited particularly, but may be determined suitably in accordance with purposes or applications. The thickness is usually approximately in a range of from 3 $\mu$m to 200 $\mu$m.

The internal conductor paste, the internal electrode paste and the external electrode paste are made up by kneading various conductive metals or alloys described previously; or various oxides, organic metal compounds, resinates, etc. which will be the above-mentioned conductive materials after burning; together with various binders and solvents described previously, respectively.

When the LC composite part 1 is manufactured, for example, the magnetic substance layer paste and the internal conductor paste are first printed and laminated onto a substrate of PET (polyethylene terephthalate) or the like, so as to form the inductor portion. The dielectric layer paste and the internal electrode paste are printed and laminated onto the inductor portion, so as to form the capacitor portion. Alternatively, the capacitor portion may be formed before the inductor portion is formed thereon. Incidentally, a green chip may be formed as follows. That is, a green sheet is formed by use of the magnetic substance layer paste and the dielectric layer paste. After the internal conductor paste and the internal electrode layer paste are printed on the green sheet, these pastes may be laminated to form a green chip. In this case, dielectric layers adjacent to magnetic substance layers may be printed directly.

Next, the external electrode paste is printed or transferred onto the green chip. The magnetic substance layer paste, the internal conductor paste, the dielectric layer paste, the internal electrode layer paste and the external electrode paste are burnt simultaneously.

Alternatively, the green chip may be burnt before the external electrode paste is printed or transferred thereon and burnt.

It is preferable that the burning temperature is set to be in a range of from 800° C. to 930° C., particularly from 850° C. to 900° C. If the burning temperature is lower than 800° C., burning becomes insufficient. On the contrary, if the burning temperature exceeds 930° C., the internal electrode material diffuses into the ferrite material so that the electromagnetic property may be conspicuously depressed. In addition, it is preferable that the burning time is set to be in a range of from 0.05 hours to 5 hours, particularly from 0.1 hour to 3 hours. Burning is carried out under the oxygen partial pressure $PO_2$=1% to 100%.

In addition, the burning temperature to burn the external electrodes is usually approximately in a range of from 500° C. to 700° C., and the burning time is usually approximately in a range of from 10 minutes to 3 hours. Burning is usually carried out in the air.

According to the present invention, it is preferable that heat treatment is carried out in an atmosphere containing more excessive oxygen than that in the atmospheric air at the time of burning or after burning.

By carrying out heat treatment in the atmosphere containing excessive oxygen, substances which were deposited or have been deposited in the form of metal such as Cu, Zn, or the like, or in the form of low-resistance oxide such as $Cu_2O$, $Zn_2O$, or the like, can be deposited in the form of high-resistance and actually harmless oxide such as CuO, ZnO, or the like. For this sake, circuit resistance of the part is improved more.

In addition, it is preferable that the heat treatment is carried out at the time of final burning or after final burning.

For example, when the green chip and the external electrodes are burned simultaneously, predetermined heat treatment is carried out preferably at the time of such burning or after such burning. On the other hand, when the external electrodes is burned after the green chip is burned, predetermined heat treatment is carried out preferably at the time of burning the external electrodes or after the burning of the external electrodes. Incidentally, when burning is carried out twice as in the latter case, the heat treatment may be carried out at the time of burning the green chip or after the burning of the green chip according to the circumstances.

The oxygen partial pressure in the heat treatment atmosphere is preferably in a range of from 20.8% to 100%, more preferably in a range of from 50% to 100%, most preferably 100%.

Incidentally, if the oxygen partial pressure is lower than 20.8% mentioned above, the capability to restrain deposition of Cu, Zn, $Cu_2O$, $Zn_2O$, etc. is lowered.

Such heat treatment in the excessive oxygen atmosphere is usually carried out at the same time that the green chip is burnt or at the same time that the external electrodes are burnt. Accordingly, conditions such as the heat treatment temperature, the retention time, and so on, are similar to the conditions for burning the green chip or the conditions for burning the external electrodes. When only the heat treatment is carried out alone, it is preferable that the heat treatment temperature is set to be in a range of from 550° C. to 900° C., particularly from 650° C. to 800° C., and the retention time is set to be in a range of from 0.5 hour to 2 hours, particularly from 1 hour to 1.5 hours.

Incidentally, composite multi-layer parts other than the LC composite part may be also manufactured in the above-mentioned manner.

The external electrodes are soldered with a printed board. Thus, the composite multi-layer part such as an LC composite part or the like manufactured thus is mounted on the printed board, and used in various kinds of electronic apparatus or the like.

The sulfur content in the magnetic substance layer 31 can be analyzed in the following manner. That is, the magnetic substance layer is separated, pulverized, and then subjected to oxidization-burning in the oxygen atmosphere. $SO_2$ converted thus is analyzed by an infrared detector. On the other hand, the chlorine content may be measured by extracting Cl from a pulverized specimen by steam distillation and measuring the absorbance of the extracted liquid. Further, the composition of $Fe_2O_3$, NiO, CuO, ZnO and MgO of the magnetic substance layer can be measured by fluorescent X-ray analysis based on a glass beads method.

The low-temperature sintered and high-performance ferrite material according to the present invention is constituted by an Fe—Ni—Cu—Zn—Mg ferrite material, wherein the sulfur content in the ferrite raw material stage is set to be in a range of from 300 ppm to 900 ppm on S basis, and the chlorine content in the ferrite raw material stage is set to be not higher than 100 ppm on Cl basis, while the sulfur content of the ferrite sinter after burning is set to be not higher than 100 ppm on S basis and the chlorine content of the ferrite sinter is set to be not higher than 25 ppm on Cl basis. Thus, it is possible to obtain a ferrite material which provides a high density without using any additive, and which has a small temperature characteristic in spite of the high density. In addition, ferrite cores and multi-layer chip parts composed of this ferrite material are excellent in resistance to moisture and temperature characteristic. Further, the scattering of the sinter density or the inductance can be reduced.

The low-temperature sintered and high-performance ferrite material according to the present invention is constituted by an Fe—Ni—Cu—Zn ferrite material, wherein the sulfur content in the ferrite raw material stage is set to be in a range of from 300 ppm to 900 ppm on S basis, and the chlorine content in the ferrite raw material stage is set to be not higher than 100 ppm on Cl basis, while the sulfur content of the ferrite sinter after burning is set to be not higher than 100 ppm on S basis and the chlorine content of the ferrite sinter is set to be smaller than 10 ppm on Cl basis. Thus, it is possible to obtain a ferrite material which provides a high density without using any additive, and which has a small temperature characteristic in spite of the high density. In addition, ferrite cores and multi-layer chip parts composed of this ferrite material are excellent in resistance to moisture and temperature characteristic.

In addition, by use of a ferrite material comprising a composition of $Fe_2O_3$ ranging from 25 mol % to 52 mol %, ZnO of 40 mol % or lower, CuO of 20 mol % or lower, NiO of 65 mol % or lower, and MgO occupying the remainder, it is possible to provide a low-temperature burnt and high-performance ferrite material which is high in density, high in Q, high in IR, excellent in specific permeability, and excellent in temperature characteristic, without using any additive.

When a chip inductor or a chip beads part is composed of a ferrite material as mentioned above, the resistance to moisture and the temperature characteristic of such a part can be made excellent.

When a composite part having an inductor portion is composed of a ferrite material as mentioned above, it is possible to obtain a composite part in which the resistance to moisture and the temperature characteristic of the inductor portion are excellent.

When a ferrite core is composed of a ferrite material as mentioned above, it is possible to obtain a ferrite core in which the resistance to moisture and the temperature characteristic are excellent.

Second Embodiment

According to the present invention, in a ferrite material for a ceramic inductor, the specific surface area and the S content of the nickel compound are set to be in predetermined ranges respectively. Thus, it is possible to obtain a ferrite material which can be made high in density without using any additive, and which has a small temperature characteristic in spite of the high density. Ferrite cores and multi-layer chip parts composed of this ferrite material are excellent in resistance to moisture and in temperature characteristic. Further, the scattering of the sinter density or the inductance can be reduced.

A ferrite material is generally obtained by mixing an iron compound and other ferrite constituent element compounds, and burning this mixture provisionally. In this provisionally burning process, it is known that the solid phase reaction rate to form spinel crystals varies in accordance with the content of S or Cl contained in the ferrite mixture powder. Due to a difference of this reaction rate, a raw material or an intermediate product is residual or out-of-phase is produced by segregation of the raw material or the intermediate product by thermal dissociation. As a result, the powder composition is made uneven to have a bad influence on the sinter density or the magnetic properties.

It is also known that the content of S or Cl residual in powder obtained by pulverizing the powder after temporary burning affects the magnetic properties. This S or Cl is contained in the ferrite constituent element compounds.

The present inventors made an inspection based on such knowledge. As a result, by regulating the specific surface area and the S content in the nickel compound in the ferrite material, the present inventors found out a ferrite material providing a high density without using any additive, and having a small temperature characteristic in spite of the high density.

The ferrite material according to the present invention will be described below specifically. First, ferrite constituent element compounds, for example, $Fe_2O_3$, NiO, CuO, ZnO and MgO are used as starting materials, weighed to prepare an intended composition after burning, and wet-mixed with pure water by a ball mill or the like.

The wet-mixed mixture is dried by a spray drier or the like, and then burnt provisionally. The provisionally burnt mixture is levigated with pure water by a ball mill or the like. The levigated mixture is dried by a spray drier or the like. Thus, ferrite powder is obtained. At this time, a raw material having a specific surface area in a range of from 1.0 $m^2/g$ to 10 $m^2/g$ and a sulfur content in a range of from 100 ppm to 1,000 ppm on S basis is used as the nickel compound.

When the specific surface area of the nickel compound is smaller than 1.0 $m^2/g$, the nickel compound is not in the state of solid-solution even if it is burnt provisionally. Thus, the ferrite constituent element compounds are residual so that the value of the sinter density is lower than the sinter density 4.85 $g/cm^3$ guaranteeing the resistance to moisture. On the contrary, when the specific surface area of the nickel compound is larger than 10 $m^2/g$, the powder is hard to be handled. When the powder is mixed with water, the powder is light enough to float on the surface of the water. Thus, the mixing performance deteriorates. As a result, due to the bad dispersion of the nickel compound in the powder wet-mixed, the nickel compound is hard to be in the state of solid-solution after temporary burning. The ferrite constituent element compounds are residual so that the sinter density becomes lower than 4.85 $g/cm^3$. Thus, the resistance to moisture is not guaranteed.

Even if the specific surface area is in a range of from 1.0 $m^2/g$ to 10 $m^2/g$, but when the S content is lower than 100 ppm, the sinter density becomes so low that the resistance to moisture is not guaranteed. On the contrary, when the S content exceeds 1,000 ppm, the sinter density becomes high, but the diffusion of Ag or the segregation of Cu increases so that the inductance or the temperature characteristic deteriorates.

Here, the temperature characteristic indicates a rate of change between inductance measured at 25° C. and inductance measured at 85° C. with the inductance at 25° C. as a reference. The temperature characteristic is required to be within ±3%, more preferably within ±2%. Therefore, in order to sufficiently satisfy the conditions that the temperature characteristic is within ±2% and the sinter density is 4.85 $g/cm^3$, it is more preferable that the specific surface area of the nickel compound is in a range of from 2 $m^2/g$ to 5 $m^2/g$ and the sulfur content thereof is in a range of from 250 ppm to 700 ppm on S basis.

Incidentally, the specific surface area may be measured in a BET method. In addition, the sulfur content may be analyzed as follows. That is, the nickel compound as a raw material is subjected to oxidization-burning in the oxygen atmosphere. $SO_2$ converted thus is analyzed by an infrared detector.

In order to obtain an optimum provisionally burning temperature in the temporary burning of the mixed powder, powder parts provisionally burnt at different temperatures are measured by an X ray diffractometer. Thus, a provisionally burning temperature highest in the spinel synthesis rate maybe selected.

Here, the spinel synthesis rate indicates a value expressed by the following expression from peak intensity (Isp311) of a (311) plane of spinel ferrite, peak intensity (IFe104) of a (104) plane of $\alpha$-$Fe_2O_3$, and peak intensity (ICu111) of a (111) plane of Cuo in powder X ray diffraction. In addition, the X ray diffraction was measured under the conditions of a source of Cu, a voltage of 40 KV, a current of 40 mA, and a scanning speed of 20/min.

(spinel synthesis rate)=$(Isp311)/(Isp311+IFe104+ICu111) \times 100(\%)$

If the spinel synthesis rate is lower than 96%, plenty of ferrite constituent element compounds are residual so that the sinter density is low. Accordingly, the spinel synthesis rate is preferably not lower than 96%, and more preferably not lower than 99% in order to determine the optimum temperature.

The ranges of ferrite components are limited in the present invention for the following reasons.

If the principal component $Fe_2O_3$ is out of the range of from 25 mol % to 52 mol %, the sinter density does not reach 4.85 $g/cm^3$, and becomes low to cause a problem of deterioration of specific permeability, Q, insulation resistance IR, etc.

If ZnO exceeds 40 mol %, Q is lowered so that the Curie temperature becomes not higher than 100° C. That is not practical.

If CuO exceeds 20 mol %, Q is lowered. In addition, when the ferrite material is used for a-composite multi-layer part, CuO or ZnO is deposited in a bonded surface with a different material such as a capacitor material or the like. Thus, IR is lowered.

If NiO exceeds 65 mol %, the ferrite material is not sintered at a temperature not higher than the melting point of Ag. If NiO is lower than 1%, the insulation resistance IR deteriorates.

When MgO is substituted for a part of NiO, the temperature characteristic is improved while keeping the sinter density and the specific permeability. However, if MgO exceeds 15 mol %, the sinter density or the specific permeability deteriorates. Thus, the content of MgO is preferably not higher than 15 mol %.

In addition, other oxides of Co, Mn, etc., maybe contained by about 2 wt % or lower of the whole. Such elements Co and Mn do not improve the sinter density, but Co improves Q, and Mn improves the insulation resistance IR.

Examples of Second Embodiment

Examples of the present invention will be described below. Ferrite constituent element compounds were weighed to prepare a composition which would have, after burning, 49.0 mol %of $Fe_2O_3$, 25.0 mol % of NiO, 12.0 mol % of CuO, and 14.0 mol % of ZnO. The compounds were wet-mixed with pure water by a ball mill, and dried by a spray drier. Incidentally, at that time, nickel oxide used as a raw material had a specific surface area ranging from 1 $m^2/g$ to 71 $m^2/g$ and a sulfur content ranging from 0 ppm to 1,130 ppm on S basis.

Next, this mixture powder was burnt provisionally at 700 to 800° C. for 10 hours. After that, the provisionally burnt powder is levigated with pure water by a ball mill, and dried by a spray drier. Ten parts by weight of polyvinyl alcohol were added to 100 parts by weight of the pulverized powder obtained thus. Then, the powder was made into granules and press-molded into a toroidal shape.

This molded article was burnt at 880° C. for two hours so as to obtain a sinter. The sinter density was calculated from the weight and dimensions of the sinter. In addition, specific permeability pi and Q were measured as follows. That is, a wire made of copper was wound into a toroidal shape by 20 turns. Inductance and Q were measured by an LCR meter under the conditions of the measuring frequency 10 MHz and the measuring current 0.5 mA. The specific permeability $\mu i$ was obtained by the following expression.

(specific permeability $\mu i$)=$(le \times L)/(\mu o \times Ae \times N^2)$ le: magnetic path length, L: inductance of specimen, $\mu o$: permeability in vacuum, Ae: sectional area of specimen, and N: number of turns of coil Next, a multi-layer chip inductor was made up. Four parts by weight of ethyl cellulose and 78 parts by weight of terpineol were added to 100 parts by weight of the pulverized powder, and kneaded by a three-roll mill so as to prepare a magnetic substance layer paste. On the other hand, 2.5 parts by weight of ethyl cellulose and 40 parts by weight of terpineol were added to 100 parts by weight of Ag having a mean particle size of 0.6 $\mu$m, and kneaded by a three-roll mill so as to prepare an internal electrode paste. The magnetic substance layer paste and the internal electrode paste obtained thus were printed alternately so as to be laminated on each other, and burnt at 850° C. for 2 hours. Thus, a multi-layer chip inductor was obtained.

This 3216 type (3.2 mm long and 1.6 mm wide) multi-layer chip inductor measured 3.2 mm by 1.6 mm by 1.2 mm, and the number of turns was set to be 5.5. Next, external electrodes were formed in end portions of the multi-layer chip inductor by burning at 600° C. Inductance L and Q were measured by means of an LCR meter under the conditions of the measuring frequency 10 MHz and the measuring current 0.1 mA.

Inductance at 25° C. and inductance at 85° C. were measured in the measuring frequency 1 MHz, and a rate of change with the inductance at 25° C. as a reference was adopted as the temperature characteristic of the inductance of each toroidal shape and each multi-layer chip inductor.

This result is shown in Table 2.

TABLE 2

| | Nickel compound powder properties | | toroidal shape burnt at 880° C. | | | | multi-layer chip inductor burnt at 850° C. | | | |
|---|---|---|---|---|---|---|---|---|---|---|
| | Specific surface area (m²/g) | S (ppm) | sinter density (g/cm³) | specific permeability | Q | temperature characteristic (%) | sinter density (g/cm³) | inductance ($\mu$H) | Q | temperature characteristic (%) |
| Ex.1 | 1.0 | 200 | 4.85 | 79.3 | 133 | 1.38 | 5.15 | 1.50 | 54 | 1.00 |
| Ex.2 | 1.6 | 740 | 4.87 | 80.4 | 136 | 2.99 | 5.20 | 1.54 | 58 | 2.17 |
| Ex.3 | 2.7 | 240 | 4.86 | 79.8 | 132 | 1.69 | 5.16 | 1.55 | 57 | 1.17 |
| Ex.4 | 3.0 | 347 | 4.87 | 80.3 | 134 | 1.56 | 5.17 | 1.56 | 57 | 1.38 |
| Ex.5 | 3.4 | 318 | 4.86 | 79.9 | 134 | 1.30 | 5.17 | 1.54 | 55 | 1.28 |
| Ex.6 | 4.0 | 100 | 4.85 | 79.0 | 133 | 1.26 | 5.15 | 1.54 | 56 | 0.75 |
| Ex.7 | 4.3 | 391 | 4.90 | 80.8 | 137 | 1.76 | 5.18 | 1.60 | 58 | 1.67 |
| Ex.8 | 5.0 | 650 | 4.90 | 81.0 | 136 | 1.99 | 5.20 | 1.61 | 57 | 1.96 |
| Ex.9 | 7.2 | 350 | 4.90 | 81.0 | 135 | 2.00 | 5.19 | 1.55 | 56 | 2.00 |
| Comp.1 | 0.8 | 0 | 4.59 | 50.0 | 137 | −1.85 | 5.00 | 1.30 | 46 | −1.44 |
| Comp.2 | 11.9 | 0 | 4.72 | 60.0 | 145 | −1.24 | 5.02 | 1.32 | 50 | −0.59 |
| Comp.3 | 71.0 | 0 | 4.76 | 64.0 | 144 | −1.96 | 5.01 | 1.31 | 48 | −1.46 |
| Comp.4 | 4.3 | 0 | 4.67 | 54.0 | 139 | −1.51 | 5.02 | 1.32 | 49 | −0.90 |
| Comp.5 | 2.4 | 30 | 4.75 | 60.0 | 144 | −0.49 | 5.03 | 1.35 | 49 | −0.45 |
| Comp.6 | 3.2 | 80 | 4.80 | 71.0 | 134 | 0.30 | 5.09 | 1.42 | 53 | 0.50 |
| Comp.7 | 1.7 | 1130 | 5.14 | 97.0 | 130 | 4.17 | 5.15 | 1.37 | 52 | 4.28 |

As is apparent from Table 1, it is preferable that the specific surface area of the nickel compound is in a range of from 1.0 m²/g to 10 m²/g and the sulfur content thereof is in a range of from 100 ppm to 1,000 ppm on S basis. If not so, as is apparent from Comparison Examples 1 to 6, the sinter density is lower than 4.85 g/cm³ in the toroidal shape and lower than 5.15 g/cm³ in the chip inductor, so that the resistance to moisture cannot be guaranteed.

In addition, when the S content of the nickel compound exceeds 1,000 ppm, as shown in Comparison Example 7, the sinter density reaches a value which can guarantee the resistance to moisture, but the temperature characteristic shows a large value beyond ±3%.

It is understood that the ferrite materials satisfying the ranges defined in the present invention provide a sinter density not lower than 4.85 g/cm³ in the toroidal shape and not lower than 5.15 g/cm³ in the chip inductor, and the temperature characteristic can be restrained to be within ±3%.

Particularly in the case where the specific surface area of the nickel compound is in a range of from 2 m²/g to 5 m²/g and the sulfur content thereof is in a range of from 250 ppm to 750 ppm on S basis, more excellent sinter density and more excellent temperature characteristic can be obtained as is apparent from Examples 3, 4, 5, 7 and 8.

Next, with reference to FIG. 1, description will be made about an LC composite multi-layer part using a ferrite material composed of 49 mol % of $Fe_2O_3$, 25 mol % of ZnO, 9 mol % of CuO and 17 mol % of NiO according to the present invention.

An LC composite part 1 shown in FIG. 1 is integrally constituted by a capacitor portion 2 constituted by ceramic dielectric layers 21 and internal electrode layers 22 laminated on each other, and an inductor portion 3 constituted by ceramic magnetic substance layers 31 and internal conductors 32 laminated on each other. External electrodes 41 are formed on the surface of the LC composite part 1.

Incidentally, the capacitor portion 2 and the inductor portion 3 may have a conventionally known structure. Each of the capacitor portion 2 and the inductor portion 3 is usually formed into a substantially rectangular shape. The dimensions of the LC composite part 1 are not limited particularly, but can be set suitably in accordance with applications. The dimensions of the LC composite part 1 may measure approximately 1.6~10.0 mm by 0.8~5.0 mm by 1.0~5.0 mm.

The ceramic magnetic substance layers 31 of the inductor portion 3 are composed of a ferrite material according to the present invention. That is, a magnetic substance layer paste obtained by kneading the ferrite material according to the present invention with a binder of ethyl cellulose or the like and a solvent of terpineol, butyl carbitol, or the like, is printed and laminated alternately with an internal electrode paste. Thus, the inductor portion 3 can be formed. The contents of the binder and the solvent in the magnetic substance layer paste are not limited. For example, the content of the binder may be set to be in a range of from 1 wt % to 5 wt %, and the content of the solvent may be set to be approximately in a range of from 10 wt % to 50 wt %.

Alternatively, the inductor portion 3 may be formed by use of a ceramic magnetic substance layer sheet. That is, slurry obtained by kneading the ferrite material according to the present invention with a binder having polyvinyl butyral or acrylic resin as its principal component and a solvent of toluene, xylene, or the like, in a ball mill is applied onto a polyester film or the like in a doctor blade method or the like, and dried to obtain a magnetic substance layer sheet. The content of the binder in this magnetic substance layer sheet is not limited. For example, the content of the binder may be set to be approximately in a range of from 1 wt % to 5 wt %.

The conductive material composing the internal electrodes 32 of the inductor portion 3 is not limited particularly. It is, however, preferable that the internal electrodes 32 are formed out of a conductive material mainly composed of Ag with a low electric resistivity in order to obtain practical Q for inductor. Ag, Ag alloys, Cu, Cu alloys, etc. are usually used. Each layer of the internal electrodes 32 has an oval shape. Spiral electrical conduction is ensured between adjacent layers of the internal electrodes 32. Thus, the internal electrodes 32 form a closed magnetic path coil (winding pattern). The external electrodes 41 are connected to the opposite ends of the closed magnetic path coil.

In such a case, the winding pattern, that is, the closed magnetic path shape of the internal conductors 32 can be formed into various patterns. The number of turns thereof may be selected suitably in accordance with applications. In addition, the dimensions and so on of respective parts in the inductor portion 3 are not limited, but may be selected suitably in accordance with applications.

Incidentally, the internal conductors 32 are usually designed so that the thickness is approximately in a range of from 3 $\mu$m to 50 $\mu$m, the winding pitch is approximately in a range of from 10 $\mu$m to 400 $\mu$m, and the number of turns is approximately in a range of from 1.5 to 50.5. On the other hand, the magnetic layers 31 are usually designed so that the base thickness is in a range of from 100 $\mu$m to 500 $\mu$m, and the magnetic layer thickness between the internal conductors 32 and 32 is approximately in a range of from 10 $\mu$m to 100 $\mu$m.

The material used for the ceramic dielectric layers 21 of the capacitor portion 2 is not limited particularly. Although various dielectric materials are available, it is preferable that a titanium oxide dielectric material is used because it has a low burning temperature. Alternatively, titanate composite oxides, zirconate composite oxides, or mixtures thereof may be used. In addition, the material may contain glass such as borosilicate glass in order to reduce the burning temperature.

Specifically, $TiO_2$ or the like containing NiO, CuO, $Mn_3O_4$, $Al_2O_3$, MgO, $SiO_2$, or the like, particularly containing CuO, in accordance with necessity, may be used as the titanium oxide dielectric material; $BaTiO_3$, $SrTiO_3$, $CaTiO_3$, $MgTiO_3$, or a mixture thereof, maybe used as the titanate composite oxide; and $BaZrO_3$, $SrZrO_3$, $CaZrO_3$, $MgZrO_3$, or a mixture thereof may be used as the zirconate composite oxide. Alternatively, if a mixed material is not used, for example, non-magnetic Zn ferrite or the like may be used.

A dielectric layer paste obtained by kneading the material used for the ceramic dielectric layers 21 of the capacitor portion 2 together with various binders and solvents may be printed and laminated alternately with the internal electrode paste. The contents of the binder and the solvent contained in the dielectric layer paste are not limited. For example, the content of the binder may be set to be in a range of from 1 wt % to 5 wt %, and the content of the solvent may be set to be approximately in a range of from 10 wt % to 50 wt %.

Alternatively, the capacitor portion 2 may be formed by use of a dielectric layer sheet. That is, slurry obtained by kneading a dielectric material together with various binders and solvents in a ball mill is applied onto a polyester film or the like in a doctor blade method or the like, and dried to obtain a dielectric layer sheet. This dielectric layer sheet and the internal electrode paste are laminated alternately. Thus, the capacitor portion 2 can be formed. The content of the binder in this dielectric layer sheet is not limited. For example, the content of the binder may be set to be approximately in a range of from 1 wt % to 5 wt %.

The conductive material composing the internal electrode layers 22 of the capacitor portion 2 is not limited particularly. The conductive material may be selected from Ag, Pt, Pd, Au, Cu, Ni, alloys containing at least one kind of such metal, for example, an Ag—Pd alloy, and so on. Particularly, Ag, Ag alloys such as an Ag—Pd alloy, and so on, are preferred.

The dimensions of respective parts in the capacitor portion 2 are not limited particularly, but may be selected suitably in accordance with applications or the like. Incidentally, the number of the dielectric layers 21 is in a range of from 1 to 100, the thickness per layer of the dielectric layers is in a range of from 10 $\mu$m to 150 $\mu$m, and the thickness per layer of the internal electrode layers 22 is approximately in a range of from 3 $\mu$m to 30 $\mu$m.

The conductive material used for the external electrodes 41 is not limited particularly. The conductive material may be selected from Ag, Pt, Pd, Au, Cu, Ni, alloys containing at least one kind of such metal, for example, an Ag—Pd alloy, and so on. The shape, dimensions, and so on, of the external electrodes 41 are not limited particularly, but may be determined suitably in accordance with purposes or applications. The thickness is usually approximately in a range of from 3 $\mu$m to 200 $\mu$m.

The internal conductor paste, the internal electrode paste and the external electrode paste are made up by kneading various conductive metals or alloys described previously; or various oxides, organic metal compounds, resinates, etc. which will be the above-mentioned conductive materials after burning; together with various binders and solvents described previously, respectively.

When the LC composite part 1 is manufactured, for example, the magnetic substance layer paste and the internal conductor paste are first printed and laminated onto a substrate of PET (polyethylene terephthalate) or the like, so as to form the inductor portion 3. The dielectric layer paste and the internal electrode paste are printed and laminated onto the inductor portion 3, so as to form the capacitor portion 2. Alternatively, the capacitor portion 2 maybe formed before the inductor portion 3 is formed thereon.

Incidentally, a green chip may be formed as follows. That is, a green sheet is formed by use of the magnetic substance layer paste and the dielectric layer paste. After the internal conductor paste and the internal electrode layer paste are printed on the green sheet, these pastes may be laminated to form a green chip. In this case, dielectric layers adjacent to magnetic substance layers may be printed directly.

Next, the external electrode paste is printed or transferred onto the green chip. The magnetic substance layer paste, the internal conductor paste, the dielectric layer paste, the internal electrode layer paste and the external electrode paste are burnt simultaneously.

Alternatively, the green chip may be burnt before the external electrode paste is printed or transferred thereon and burnt.

It is preferable that the burning temperature is set to be in a range of from 800° C. to 930° C., particularly from 850° C. to 900° C. If the burning temperature is lower than 800° C., burning becomes insufficient. On the contrary, if the burning temperature exceeds 930° C., the internal electrode material diffuses into the ferrite material so that the electromagnetic property may be conspicuously depressed. In addition, it is preferable that the burning time is set to be in a range of from 0.05 hours to 5 hours, particularly from 0.1 hour to 3 hours. Burning is carried out under the oxygen partial pressure $PO_2=1\%$ to 100%.

In addition, the burning temperature to burn the external electrodes is usually approximately in a range of from 500° C. to 700° C., and the burning time is usually approximately in a range of from 10 minutes to 3 hours. Burning is usually carried out in the air.

According to the present invention, it is preferable that heat treatment is carried out in an atmosphere containing more excessive oxygen than that in the atmospheric air at the time of burning or after burning.

By carrying out heat treatment in the atmosphere containing excessive oxygen, substances which were deposited or have been deposited in the form of metal such as Cu, Zn, or the like, or in the form of low-resistance oxide such as $Cu_2O$, $Zn_2O$, or the like, can be deposited in the form of high-resistance and actually harmless oxide such as CuO, ZnO, or the like.

In addition, it is preferable that the heat treatment is carried out at the time of burning or after burning.

For example, when the green chip and the external electrodes are burned simultaneously, predetermined heat treatment is carried out preferably at the time of such burning or after such burning. On the other hand, when the external electrodes is burned after the green chip is burned, predetermined heat treatment is carried out preferably at the time of burning the external electrodes or after the burning of the external electrodes. Incidentally, when burning is carried out twice as in the latter case, the heat treatment may be carried out at the time of burning the green chip or after the burning of the green chip according to the circumstances.

The oxygen partial pressure in the heat treatment atmosphere is preferably in a range of from 20.8% to 100%, more preferably in a range of from 50% to 100%, most preferably 100%.

Incidentally, if the oxygen partial pressure is lower than 20.8% mentioned above, the capability to restrain deposition of Cu, Zn, $Cu_2O$, $Zn_2O$, etc. is lowered.

Such heat treatment in the excessive oxygen atmosphere is usually carried out at the same time that the green chip is burnt or the external electrodes are burnt. Accordingly, conditions such as the heat treatment temperature, the retention time, and so on, are similar to the conditions for burning the green chip or the conditions for burning the external electrodes. When only the heat treatment is carried out alone, it is preferable that the heat treatment temperature is set to be in a range of from 550° C. to 900° C., particularly from 650° C. to 800° C., and the retention time is set to be in a range of from 0.5 hour to 2 hours, particularly from 1 hour to 1.5 hours.

Composite multi-layer parts other than the LC composite part may be also manufactured in the above-mentioned manner.

The external electrodes are soldered with a printed board or the like. Thus, the composite multi-layer part such as an LC composite part or the like manufactured thus is mounted on the printed board or the like, and used in various kinds of electronic apparatus or the like.

The composition of $Fe_2O_3$, NiO, CuO, ZnO and MgO in the magnetic substance layer can be measured by fluorescent X-ray analysis based on a glass beads method.

According to the present invention, the following effects can be obtained.

By use of a ferrite material constituted by a nickel ferrite material using a nickel compound as a raw material, the nickel compound having a specific surface area in a range of from 1.0 $m^2/g$ to 10 $m^2/g$ and a sulfur content in a range of from 100 ppm to 1,000 ppm on S basis, it is possible to provide a ferrite material which can be made high in density without using any additive, and which has a small temperature characteristic in spite of the high density. In addition, because multi-layer chip parts or ferrite cores composed of the ferrite material is high in density, it is possible to provide multi-layer chip parts or ferrite cores good in moisture resistance and excellent in temperature characteristic.

By use of a ferrite material constituted by a nickel ferrite material using a nickel compound-as a raw material, the nickel compound having a specific surface area in a range of from 1.0 $m^2/g$ to 10 $m^2/g$ and a sulfur content in a range of from 100 ppm to 1,000 ppm on S basis, wherein the ferrite material has a composition of $Fe_2O_3$ ranging from 25 mol % to 52 mol %, ZnO ranging from 0 mol % to 40 mol %, Cuo ranging from 0 mol % to 20 mol %, NiO ranging 1 mol % to 65 mol %, and MgO occupying the remainder, it is possible to provide a ferrite material which can be made high in density without using any additive, and which has an excellent temperature characteristic in spite of the high density. In addition, the ferrite material can be sintered at a temperature not higher than the melting point of Ag. Multi-layer chip parts or ferrite cores composed of the ferrite material also have similar excellent properties.

By use of a chip part constituted by a chip inductor or a chip beads part configured by laminating ferrite magnetic layers and internal conductors; wherein the ferrite magnetic layers is composed of: an Ni ferrite material using a nickel compound as a raw material, the nickel compound having a specific surface area in a range of from 1.0 $m^2/g$ to 10 $m^2/g$ and a sulfur content in a range of from 100 ppm to 1,000 ppm on S basis; or an Ni ferrite material using a nickel compound as a raw material, the nickel compound having a specific surface area in a range of from 1.0 $m^2/g$ to 10 $m^2/g$ and a sulfur content in a range of from 100 ppm to 1,000 ppm on S basis, the Ni ferrite material having a composition of $Fe_2O_3$ ranging from 25 mol % to 52 mol %, ZnO ranging from 0 mol % to 40 mol %, CuO ranging from 0 mol % to 20 mol %, NiO ranging 1 mol % to 65 mol %, and MgO occupying the remainder, it is possible to provide a chip inductor or a chip beads part which has a small temperature characteristic in spite of high density and which can be sintered at a temperature not higher than the melting point of Ag.

By use of a composite multi-layer part constituted by at least an inductor portion configured by laminating ferrite magnetic layers and internal conductors; wherein the ferrite magnetic layers is composed of: an Ni ferrite material using a nickel compound as a raw material, the nickel compound having a specific surface area in a range of from 1.0 $m^2$/g to 10 $m^2$/g and a sulfur content in a range of from 100 ppm to 1,000 ppm on S basis; or an Ni ferrite material using a nickel compound as a raw material, the nickel compound having a specific surface area in a range of from 1.0 $m^2$/g to 10 $m^2$/g and a sulfur content in a range of from 100 ppm to 1,000 ppm on S basis, the Ni ferrite material having a composition of $Fe_2O_3$ ranging from 25 mol % to 52 mol %, ZnO ranging from 0 mol % to 40 mol %, CuO ranging from 0 mol % to 20 mol %, NiO ranging 1 mol % to 65 mol %, and MgO occupying the remainder, it is possible to provide a composite multi-layer part which has a small temperature characteristic in spite of high density and which can be sintered at a temperature not higher than the melting point of Ag.

By use of a ferrite core constituted by: an Ni ferrite material using a nickel compound as a raw material, the nickel compound having a specific surface area in a range of from 1.0 $m^2$/g to 10 $m^2$/g and a sulfur content in a range of from 100 ppm to 1,000 ppm on S basis; or an Ni ferrite material using a nickel compound as a raw material, the nickel compound having a specific surface area in a range of from 1.0 $m^2$/g to 10 $m^2$/g and a sulfur content in a range of from 100 ppm to 1,000 ppm on S basis, the Ni ferrite material having a composition of $Fe_2O_3$ ranging from 25 mol % to 52 mol %, ZnO ranging from 0 mol % to 40 mol %, CuO ranging from 0 mol % to 20 mol %, NiO ranging 1 mol % to 65 mol %, and MgO occupying the remainder, it is possible to provide a ferrite core which has a small temperature characteristic in spite of high density and which can be sintered at a temperature not higher than the melting point of Ag.

What is claimed is:

1. A nickel-basis ferrite material comprising:
   iron (Fe) component, nickel (Ni) component, copper (Cu) component, zinc (Zn) component and magnesium (Mg) component,
   wherein a sulfur (S) content of ferrite powder in a raw material stage is contained in a range of from 300 ppm to 900 ppm on S basis, and
   a chlorine (Cl) content of said ferrite powder is contained not higher than 100 ppm on Cl basis,
   while a sulfur content of a ferrite sinter after burning is contained not higher than 100 ppm on S basis, and
   a chlorine content of said ferrite sinter is contained not higher than 25 ppm on Cl basis.

2. A nickel-basis ferrite material as claimed in claim 1, wherein said chlorine content of said ferrite sinter after burning is lower than 10 ppm on Cl basis.

3. A nickel-basis ferrite material as claimed in claim 1, wherein said ferrite material has a composition of $Fe_2O_3$ ranging from 25 mol % to 52 mol %, ZnO of 40 mol % or lower, CuO of 20 mol % or lower, NiO ranging 1 mol % to 65 mol %, and MgO occupying a remainder.

4. A layered chip part comprising:
   a plurality of ferrite magnetic layers and internal conductors,
   wherein said ferrite magnetic layers are composed of a nickel-basis ferrite material comprising:
   iron (Fe) component, nickel (Ni) component, copper (Cu) component and zinc (Zn) component,
   wherein a sulfur (S) content of ferrite powder in a raw material stage is contained in a range of from 300 ppm to 900 ppm on S basis, and
   a chlorine (Cl) content of said ferrite powder is contained not higher than 100 ppm on Cl basis,
   while a sulfur content of a ferrite sinter after burning is contained not higher than 100 ppm on S basis, and
   a chlorine content of said ferrite sinter is contained not higher than 25 ppm on Cl basis.

5. A composite multi-layer part comprising:
   at least an inductor portion configured by laminating ferrite magnetic layers and internal conductors,
   wherein said ferrite magnetic layers are composed of a nickel-basis ferrite material comprising:
   iron (Fe) component, nickel (Ni) component, copper (Cu) component and zinc (Zn) component,
   wherein a sulfur (S) content of ferrite powder in a raw material stage is contained in a range of from 300 ppm to 900 ppm on S basis, and
   a chlorine (Cl) content of said ferrite powder is contained not higher than 100 ppm on Cl basis,
   while a sulfur content of a ferrite sinter after burning is contained not higher than 100 ppm on S basis, and
   a chlorine content of said ferrite sinter is contained not higher than 25 ppm on Cl basis.

6. A ferrite core comprising a nickel-basis ferrite material including:
   iron (Fe) component, nickel (Ni) component, copper (Cu) component and zinc (Zn) component,
   wherein a sulfur (S) content of ferrite powder in a raw material stage is contained in a range of from 300 ppm to 900 ppm on S basis, and
   a chlorine (Cl) content of said ferrite powder is contained not higher than 100 ppm on Cl basis,
   while a sulfur content of a ferrite sinter after burning is contained not higher than 100 ppm on S basis, and
   a chlorine content of said ferrite sinter is contained not higher than 25 ppm on Cl basis.

7. A nickel-basis ferrite material comprising:
   a ferrite material using a nickel (Ni) compound as a raw material, said nickel compound having a specific surface area in a range of from 1.0 $m^2$/g to 10 $m^2$/g and a sulfur (S) content in a range of from 100 ppm to 1,000 ppm on S basis.

8. A ferrite material according to claim 7, wherein said Ni ferrite material has a composition of $Fe_2O_3$ ranging from 25 mol % to 52 mol %, ZnO ranging from 0 mol % to 40 mol %, CuO ranging from 0 mol % to 20 mol %, NiO ranging 1 mol % to 65 mol %, and MgO occupying a remainder.

9. A layered chip part comprising a chip inductor or a chip beads part configured by laminating ferrite magnetic layers and internal conductors;
   wherein said ferrite magnetic layers is composed of:
   an Ni ferrite material using a nickel compound as a raw material, said nickel compound having a specific surface area in a range of from 1.0 $m^2$/g to 10 $m^2$/g and a sulfur (S) content in a range of from 100 ppm to 1,000 ppm on S basis.

10. A layered chip part as claimed in claim 9, wherein said Ni ferrite material having a composition of $Fe_2O_3$ ranging from 25 mol % to 52 mol %, ZnO ranging from 0 mol % to 40 mol %, CuO ranging from 0 mol % to 20 mol %, NiO ranging 1 mol % to 65 mol %, and MgO occupying a remainder.

11. A composite multi-layer part comprising at least an inductor portion configured by laminating ferrite magnetic layers and internal conductors;

wherein said ferrite magnetic layers is composed of:
an Ni ferrite material using a nickel compound as a raw material, said nickel compound having a specific surface area in a range of from 1.0 $m^2/g$ to 10 $m^2/g$ and a sulfur content in a range of from 100 ppm to 1,000 ppm on S basis.

12. A composite multi-layer part as claimed in claim 11, wherein said Ni ferrite material having a composition of $Fe_2O_3$ ranging from 25 mol % to 52 mol %, ZnO ranging from 0 mol % to 40 mol %, CuO ranging from 0 mol % to 20 mol %, NiO ranging 1 mol % to 65 mol %, and MgO occupying a remainder.

13. A ferrite core comprising:
an Ni ferrite material using a nickel compound as a raw material, said nickel compound having a specific surface area in a range of from 1.0 $m^2/g$ to 10 $m^2/g$ and a sulfur (S) content in a range of from 100 ppm to 1,000 ppm on S basis.

14. A ferrite core as claimed in claim 13, wherein said Ni ferrite material having a composition of $Fe_2O_3$ ranging from 25 mol % to 52 mol %, ZnO ranging from 0 mol % to 40 mol %, CuO ranging from 0 mol % to 20 mol %, NiO ranging 1 mol % to 65 mol %, and MgO occupying a remainder.

* * * * *